3,206,411
NOVEL SUBSTITUTED 3-FORMYL- AND 3-LOWER ALKANOYL-4,5-INDOLOQUINONES AND NOVEL METHODS OF PREPARING THE SAME
George Rodger Allen, Jr., Old Tappan, N.J., and John Frank Poletto, Nanuet, N.Y., assignors to American Cyanamid Company, Stamford, Conn., a corporation of Maine
No Drawing. Filed Oct. 11, 1963, Ser. No. 315,716
4 Claims. (Cl. 260—319)

This invention relates to new organic compounds and, more particularly, is concerned with novel substituted 3-formyl- and 3-lower alkanoyl-4,5-indoloquinones and with novel methods of preparing these compounds. The novel substituted 3-formyl- and 3-lower alkanoyl-4,5-indoloquinones of the present invention may be represented by the following general formula:

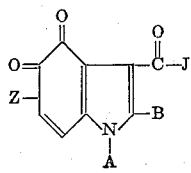

wherein A and Z are lower alkyl and B and J are each hydrogen or lower alkyl. Suitable lower alkyl groups contemplated by the present invention are those having up to about 6 carbon atoms.

The novel compounds of the present invention are obtainable as crystalline materials having characteristic melting points and absorption spectra. They are appreciably soluble in many organic solvents such as lower alkanols, acetone, ethyl acetate, and the like. They are, however, generally insoluble in water.

The novel substituted 3-formyl- and 3-lower alkanoyl-4,5-indoloquinones of the present invention are useful as intermediates in the preparation of the biologically active 3-(α-carbamoyloxyalkyl)-4,7-indoloquinones and 3-(α-acyloxyalkyl)-4,7-indoloquinones as is set forth in greater detail in our copending applications Ser. No. 315,710 (now abandoned) and Ser. No. 315,695, filed concurrently herewith. For example, a 3-formyl- or 3-lower alkanoyl-4,5-indoloquinone may be converted into the corresponding 4,7-indoloquinone via an intermediate 4,5,7-lower alkanoyloxyindole prepared by treating the ortho-quinone with a lower alkanoyl anhydride and a strong acid such as boron trifluoride. When the ortho-quinone contains a 3-acyl substituent, concomitant enol acylation of the carbonyl group occurs. The triacyloxyindoles then may be hydrolyzed to the corresponding trihydricphenols, which on oxidation with air or other oxidizing agents, furnish the corresponding 5-hydroxy-4,7-para-quinone. During the hydrolysis step, the enol acylate formed in the acylation of a 4,5-ortho-quinone containing a 3-acyl substituent is hydrolyzed to regenerate the 3-acyl substituent. The 5-hydroxy-4,7-para-quinones may be O-alkylated to give the corresponding 5-alkoxy-4,7-para-quinones; of particular value for this conversion are the dialkyl sulfates and tetra-alkoxymethanes. Reduction of the 5-alkoxy-para-quinones, followed by oxidation of the hydroquinone thus formed, gives the 3-(α-hydroxyalkyl)-para-quinones. Sodium borohydride is particularly useful for this reduction.

Treatment of a 3-(α-hydroxyalkyl)-4,7-indoloquinone with an acylating agent furnishes the corresponding 3-(α-acyloxyalkyl)-4,7-indoloquinone derivative. Treatment of a 3-(α-hydroxyalkyl)-4,7-indoloquinone with a lower alkyl chloroformate or phenyl chloroformate gives rise to the corresponding 3-(α-alkoxycarbonyloxyalkyl)- or 3-(α-phenoxycarbonyloxyalkyl)-4,7-indoloquinone derivative. The phenyl carbonate esters are particularly useful for the preparation of certain of the 3-(α-carbamoyloxyalkyl)-4,7-indoloquinones. Thus, upon treatment of the phenyl carbonate esters with a lower alkyl amine there is obtained the corresponding 3-(α-alkylcarbamoyloxyalkyl)-5-alkylamino-4,7-indoloquinone, while treatment with ammonia or a di(lower alkyl) amine is productive of the 3-(α-carbamoyloxyalkyl)- or 3-(α-dialkylcarbamoyloxyalkyl)-4,7-indoloquinone derivatives. Moreover, other 3-(α-carbamoyloxyalkyl)-4,7-indoloquinones may be prepared by the treatment of a 3-(α-hydroxyalkyl)-4,7-indoloquinone with a lower alkyl, lower alkenyl, or aryl isocyanate, or with a diphenyl carbamoyl chloride.

The novel 3-formyl- and 3-lower alkanoyl-4,5-indoloquinones of the present invention may be prepared in accordance with the following reaction scheme:

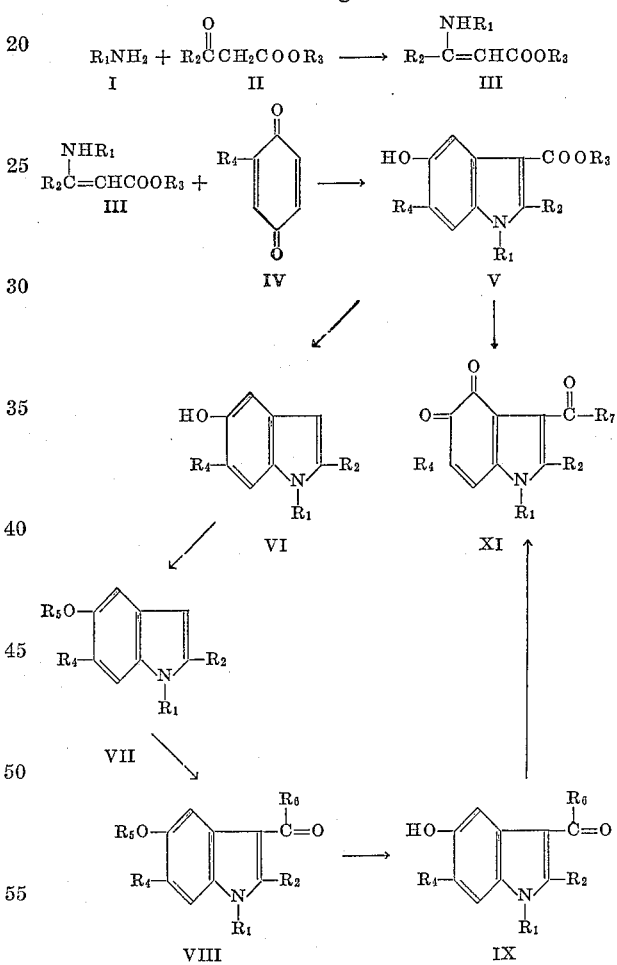

wherein $R_1$, $R_2$, $R_3$, $R_4$ and $R_5$ are lower alkyl, $R_6$ is hydrogen or lower alkyl and $R_7$ is hydrogen, lower alkyl or lower alkoxy. In accordance with this reaction scheme, the indole system (V) is developed by condensation of a substituted 1,4-benzoquinone (IV) with a substituted amino-crotonate ester (III). The latter reagent is prepared by the interaction of an appropriate amine (I) with a β-ketoester (II). The resulting 5-hydroxy-3-indolecarboxylic ester (V) may be converted into other useful 5-hydroxyindoles (IX). Thus, decarbalkoxylation of the 3-indolecarboxylic ester (V) gives the 5-hydroxyindoles (VI); a particularly useful reagent for this transformation being hydrochloric acid. The resulting 5-hydroxyindole (VI) is then O-alkylated to furnish the 5-alkoxyindole (VII). Treatment of this product with phosphorus oxychloride and dimethylformamide or with an alkanoyl anhydride and alkali metal alkanoate affords the corresponding 3-carboxaldehyde or 3-acyl derivative (VIII). The ether function in this class of compounds is then cleaved to give the important 5-hydroxyindoles (IX); this cleavage may be effected with hydriodic acid or aluminum chloride in boiling xylene. The 5-hydroxyindoles (V, IX) may be converted into the 4,5-ortho-quinones (XI) by any of several methods well-known to the art for the conversion of a phenol into an ortho-quinone. Particularly useful for this transformation is potassium nitrosodisulfonate (Fremy's salt) which accomplishes this conversion in one step.

The novel 3-formyl- and 3-lower alkanoyl-4,5-indoloquinones of the present invention may also be prepared in accordance with the following reaction scheme:

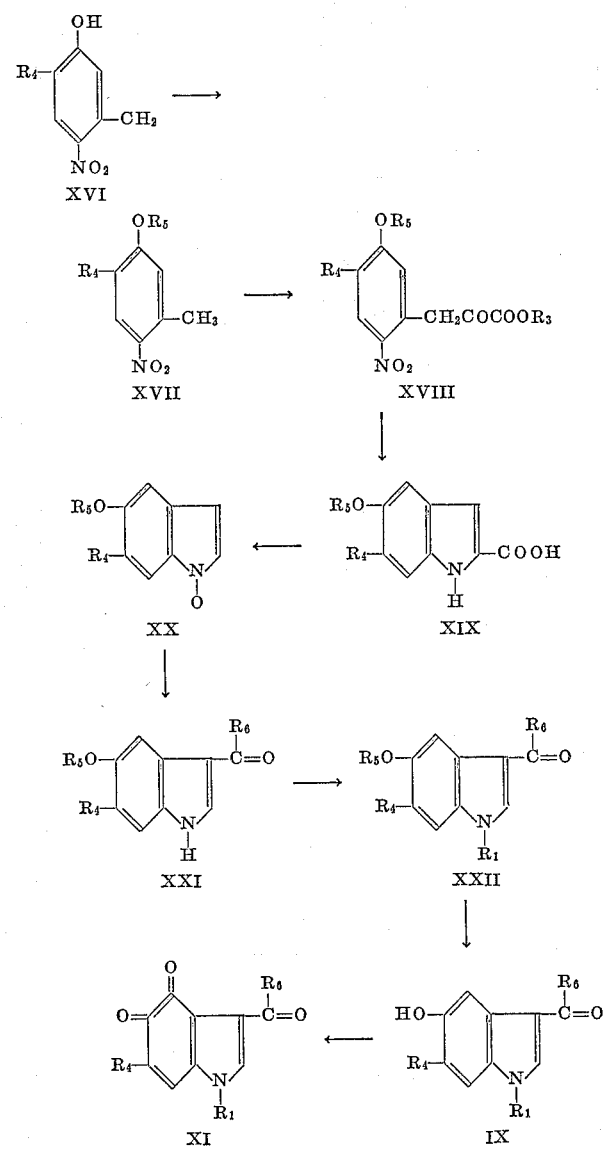

wherein $R_1$, $R_3$, $R_4$ and $R_5$ are lower alkyl; and $R_6$ is hydrogen or lower alkyl. This sequence is of particular value for the preparation of those 3-formyl- and 3-lower alkanoyl-4,5-indoloquinones bearing hydrogen at the 2-position, i.e., compounds such as (XI). In accordance with this reaction scheme an ortho-alkyl-para-nitro-meta-cresol (XVI) is treated with an alkylating agent such as an alkyl halide or dialkyl sulfate in the presence of base to give the alkyl aryl ether (XVII). Base-catalyzed acylation of (XVII) with a dialkyl oxalate affords the glyoxylic ester (XVIII). Reductive cyclization of this ester furnishes a 6-alkyl-5-alkoxy-2-indolecarboxylic acid (XIX); this reductive cyclization may be achieved with zinc dust in acetic acid, ferrous ammonium sulfate, sodium hydrosulfite or the like. Decarboxylation of the acid (XIX) then gives the indole (XX) which on treatment with phosphorus oxychloride and dimethylformamide or a dimethylalkanoylamide furnishes the 3-formyl- or 3-acylindole (XXI). On treatment with a strong base such as potassium hydroxide or sodium hydride and an alkylating agent such as an alkyl halide or a dialkyl sulfate,, the 3-formyl- and 3-acylindoles (XXI) afford the corresponding 1-alkyl derivatives (XXII). The ether function in this class of compounds is then cleaved to give the important 5-hydroxyindoles (IX); this cleavage may be effected with hydriodic acid or aluminum chloride in boiling xylene. The 5-hydroxyindoles (IX) may be converted into the 4,5-ortho-quinones (XI) by any of several methods well-known to the art for the conversion of a phenol into an ortho-quinone. Particularly useful for this transformation is potassium nitrosodisulfonate (Fremy's salt) which accomplishes this conversion in one step.

The invention will be described in greater detail in conjunction with the following specific examples.

EXAMPLE 1

*Preparation of ethyl β-ethylaminocrotonate*

With mechanical stirring a stream of ethylamine is introduced into 98.5 g. (100 ml.) of ethyl acetoacetate for 3 hours. During the first hour cooling is required to hold the temperature at 35–40° where it is maintained throughout the reaction. Ether (200 ml.) is added, and the water is separated. The ether is removed from the organic phase and the residue is distilled under reduced pressure to give a water white liquid, B.P. 20 mm. 116–118°; $n_D^{25}$ 1.4941, 104 g.

EXAMPLE 2

*Preparation of ethyl 1-ethyl-5-hydroxy-2,6-dimethyl-3-indolecarboxylate*

A solution of 122 g. (0.0855 mole) of ethyl β-ethylaminocrotonate (Example 1) in 60 ml. of acetone is thoroughly swept with nitrogen and treated with 10.9 g. (0.0895 mole) of toluoquinone. The deep red solution is heat on the steam-bath for 2 hours, cooled in an ice-bath and filtered to give a dark solid. This material is washed with cold acetone and dried to give 4.45 g. of gray crystals. The combined filtrate and washings are concentrated to about 50 ml. volume and placed in the refrigerator for 16 hours. The solid is collected by filtration and washed with boiling light petroleum to give an additional 3.90 g. of crystals. A sample is recrystallized from dilute ethanol containing a trace of sodium hydrosulfite to give off-white crystals, M.P. 196–198°.

EXAMPLE 3

*Preparation of 1-ethyl-5-hydroxy-2,6-dimethylindole*

A mechanically stirred mixture of 50.0 g. of ethyl 1-ethyl-5-hydroxy-2,6-dimethyl-3-indolecarboxylate (Example 2) and 500 ml. of 20% hydrochloric acid solution is heated at reflux temperature for 2 hours. The acid solution is diluted with 500 ml. of water, saturated with sodium chloride and extracted well with ethyl acetate. The extracts are dried over magnesium sulfate and evaporated. The residue crystallizes from methylene chloride-petroleum ether (B.P. 30–60°) to give 26.0 g. of crystals, M.P. 113–117°. An additional 4.8 g. of crystals is obtained by concentration of the mother liquor. This material also has a crystalline modification that melts at 90–92°. Both forms have identical infrared spectra in carbon tetrachloride solution.

EXAMPLE 4

*Preparation of 1-ethyl-5-methoxy-2,6-dimethylindole*

To a magnetically stirred solution of 49.1 g. of 1-ethyl-5-hydroxy-2,6-dimethylindole (Example 3) in 300 ml. of ethyl alcohol and 600 ml. of 2 N sodium hydroxide solution is added dropwise over 90 min. at reflux temperature under nitrogen 100 g. (74 ml.) of methyl sulfate. The resulting mixture is heated at reflux temperature for an additional 60 min. and then extracted with ethyl acetate. The extract is washed with saline, dried over magnesium sulfate and evaporated. The residual brown oil is dissolved in benzene and passed through a magnesia-silica gel column (1.0 x 2.5 in.), benzene being used as the eluting solvent and 250 ml. fractions being collected. Fraction 1 contains 46.9 g. of amber oil and fraction 2 contains 1.0 g. These fractions crystallize on standing. A sample of this material is recrystallized from hexane to give white crystals, M.P. 56–57°.

EXAMPLE 5

*Preparation of 1-ethyl-5-methoxy-2,6-dimethyl-3-indolecarboxaldehyde*

To 200 ml. of magnetically-stirred, ice-chilled dimethylformamide is added dropwise at such a rate that the temperature remains at 0–5° C. 55 g. (32.8 ml.) of phosphorus oxychloride. The resulting solution is treated with a solution of 66.35 g. of 1-ethyl-5-methoxy-2,6-dimethylindole (Example 4) in 150 ml. of dimethylformamide at such a rate that the temperature does not exceed 5° C. The ice bath is removed and replaced by a warm water-bath, and the mixture is stirred at 35–40° for 1.25 hr. Cracked ice (200 ml.) is added and the mixture is transferred to a 3-l. roundbottom flask containing about 300 g. of cracked ice, 200 ml. of water being used to aid in the transfer. A solution of 250 g. of sodium hydroxide in 650 ml. of water is added dropwise with mechanical stirring until about one-half of the solution has been added; the remainder of the solution is added rapidly. The resulting mixture is heated to the boiling point, diluted with water to a volume of about 2.5 l. and cooled. Filtration gives 70.5 g. of crystals, M.P. 134–136°.

EXAMPLE 6

*Preparation of 3-acetyl-1-ethyl-5-methoxy-2,6-dimethylindole*

A mechanically stirred mixture of 12.9 g. of 1-ethyl-5-methoxy-2,6-dimethylindole (Example 4) and 10 g. of sodium acetate in 300 ml. of acetic anhydride is heated at reflux temperature for 6 hours. The reaction mixture is cooled, poured onto crushed ice and stirred for 3 hours. The reaction mixture is warmed in the steam-bath and then stirred for an additional 30 minutes and then extracted with methylene chloride. The extract is successively washed with water, saturated sodium bicarbonate solution and finally with water. The organic solution is dried over anhydrous sodium sulfate and taken to dryness to give 14 g. of an oil. A sample of the oil is distilled and the fraction boiling at 150–170°/0.2 mm. Hg is crystallized from petroleum ether (B.P. 30–60°) to give a white solid, M.P. 88–89° C.

EXAMPLE 7

*Preparation of 1-ethyl-5-hydroxy-2,6-dimethyl-3-indolecarboxaldehyde*

A mixture of 38.4 g. of 1-ethyl-5-methoxy-2,6-dimethyl-3-indolecarboxaldehyde (Example 5) and 46.0 g. of aluminum chloride in 1 l. of xylene is mechanically stirred at reflux temperature for 5 hours. The cooled mixture is treated with cracked ice and digested to give 38.0 g. of pink solid, M.P. 246–250° dec. A sample is recrystallized from acetone to give cream-colored crystals, M.P. 256–259° dec.

EXAMPLE 8

*Preparation of 3-acetyl-1-ethyl-5-hydroxy-2,6-dimethylindole*

A mixture of 12 g. of the crude 3-acetyl-1-ethyl-5-methoxy-2,6-dimethylindole (Example 6) and 13.1 g. of aluminum chloride in 450 ml. of xylene is mechanically stirred at reflux temperature for 5 hours. The cooled mixture is treated with cracked ice and digested to give 8.2 g. of a pink solid, M.P. 250–255° C. A sample is recrystallized from acetone to give cream colored crystals, M.P. 262–265° dec.

EXAMPLE 9

*Preparation of ethyl 1-ethyl-2,6-dimethyl-4,5-dioxo-3-indolecarboxylate*

To a mechanically stirred solution of 18.0 g. of potassium nitrosodisulfonate in 400 ml. of water and 200 ml. of M/6 potassium dihydrogen phosphate is added a solution of 2.47 g. of ethyl 1-ethyl-5-hydroxy-2,6-dimethyl-3-indolecarboxylate (Example 2) in 500 ml. of acetone. The resulting brown solution becomes purple in 5–10 min. and is allowed to stand at room temperature for 16 hours. The solution is diluted with water and extracted with methylene chloride. The combined extracts are dried over magnesium sulfate and taken to dryness. The residue crystallizes upon trituration with ether. This material is crystallized from acetone-petroleum ether (B.P. 60–70°) to give, in three crops, 1.545 g. of black crystals, M.P. 115–118°.

EXAMPLE 10

*Preparation of 1-ethyl-2,6-dimethyl-4,5-dioxo-3-indolecarboxaldehyde*

To a mechanically stirred solution of 50.0 g. (0.187 mole) of potassium nitrosodisulfonate in 1440 ml. of M/6 potassium dihydrogen phosphate solution and 2510 ml. of water is added a solution of 18.75 g. (0.0864 mole) of 1 - ethyl-5-hydroxy-2,6-dimethyl-3-indolecarboxaldehyde (Example 7) in 3950 ml. of hot acetone. Some solid separates, and an additional 400 ml. of acetone is added. The initially blue solution turns brown on addition of the aldehyde and becomes purple within 5 min. Stirring is continued at room temperature for 1 hour. The reaction mixture is then concentrated under reduced pressure, 3200 ml. of distillate being collected. The concentrate is chilled and filtered. The residue is washed well with water and air-dried to give 16.05 g. of black needles, M.P. 205–208°. A sample is recrystallized from acetone-hexane to give black needles, M.P. 214—216.

EXAMPLE 11

*Preparation of 3-acetyl-1-ethyl-2,6-dimethyl-4,5-dioxoindole*

To a mechanically stirred solution of 2.05 g. of potassium nitrosodisulfonate in 153 ml. of M/6 potassium dihydrogen phosphate solution and 300 ml. of water is added a solution of 295 mg. of 3-acetyl-1-ethyl-5-hydroxy-2,6-dimethylindole (Example 8) in 300 ml. of hot acetone. The initially blue solution turns brown on addition of the indole and becomes purple within 30 minutes. Stirring is continued at room temperature for 4 hours. The solution is diluted with an equal volume of water and extracted with methylene chloride. The combined extracts are washed with saline, dried over anhydrous sodium sulfate and concentrated to small volume and filtered. The filtrate is evaporated with concomittant addition of petroleum ether (30–60°). Once crystallization begins, the mixture is cooled. Filtration gives 176 mg. of dark brown solid, M.P. 162–165° C. A sample is recrystallized from methylene chloride-petroleum ether (30–60°) to give dark brown needles, M.P. 164–166° C.

EXAMPLE 12

*Preparation of 2,5-dimethyl-4-nitroanisole*

A well stirred suspension of 16.7 g. (0.1 mole) of 2,5-dimethyl-4-nitrophenol (R. L. Datta and P. S. Varma, J. Am. Chem. Soc., 41, 2042 (1919)) in 50 ml. of water at 40–45° is treated alternately and in portions with a solution of 7.0 g. of sodium hydroxide in 18 ml. of water and 12 ml. of methyl sulfate. After 2 hours the mixture is filtered, and the solid is recrystallized from dilute methanol to give 14.5 g. (80% yield) of needles, M.P. 90–92°.

EXAMPLE 13

*Preparation of 5-methoxy-4-methyl 2-nitrophenylpyruvic acid*

Ethanol (6.25 ml.) is added to a mechanically stirred slurry of 2.15 g. (0.055 g.-atom) of potassium in benzene. After all of the potassium reacts, the solvents are removed by distillation, benzene (50 ml.) is added and removed in the same manner. The cooled residue is slurried in 100 ml. of ether and treated with 7.3 g. (0.05 mole, 6.75 ml.) of ethyl oxalate. To the resulting solution is added a solution of 9.05 g. (0.05 mole) of 2,5-dimethyl-4-nitro-anisole (Example 12) in 150 ml. of ether. A red solid separates immediately and the mixture is mechanically stirred at room temperature for 18 hours and then at reflux temperature for 4 hours. The mixture is filtered, and the solid is washed with ether. The residue is dissolved in water and the solution is heated on the steam-bath for 30 minutes. The solution is cooled and extracted with ether. The aqueous solution is acidified with hydrochloric acid and filtered to give 6.123 g. of crystals, M.P. 167–170°.

EXAMPLE 14

*Preparation of 5-methoxy-6-methyl-2-indolecarboxylic acid*

A solution of 42.0 g. (0.166 mole) of 5-methoxy-4-methyl-2-nitrophenylpyruvic acid (Example 13) in 230 ml. of 17% ammonium hydroxide and 115 ml. of water is treated with a hot solution of 300 g. of ferrous sulfate heptahydrate in 340 ml. of water. The mixture is mechanically stirred at steam-bath temperature for 1 hour and then allowed to cool to room temperature and filtered.

The residue is washed with dilute ammonium hydroxide until a test portion becomes only milky on acidification. The combined filtrate and washings are acidified with hydrochloric acid and the solid which separates is collected by filtration. The moist solid is recrystallized from dilute acetic acid to give 19.0 g. (56% yield) of light brown solid, M.P. 240–242° (gas evolution).

EXAMPLE 15

*Preparation of 5-methoxy-6-methylindole*

5-methoxy-6-methyl-2-indolecarboxylic acid (Example 14) (3.61 g., 17.6 mmoles) is heated at 260–270° until the melt becomes quiescent and then taken to and held briefly at 300°. The cooled material is dissolved in ether, and this solution is washed with sodium carbonate solution, treated with activated carbon, dried over magnesium sulfate and taken to dryness. The solid is recrystallized from ether-petroleum ether to give 2.12 g. of crystals, M.P. 119–120°.

EXAMPLE 16

*Preparation of 5-methoxy-6-methyl-3-indolecarboxaldehyde*

To 3.5 ml. of dimethylformamide is added with magnetic stirring and ice cooling 1.69 g. (11 mmoles, 1 ml.) of phosphorus oxychloride. To this solution is then added dropwise a solution of 1.61 g. (10 mmoles) of 5-methoxy-6-methylindole (Example 15) in 8 ml. of dimethylformamide. The temperature of the reaction is kept below 10° C. during the addition which requires 20 minutes. A solid separates 15 minutes after the start of the addition. Upon completion of the addition, the ice bath is removed and replaced by a warm water bath. The paste is kept at 30–35° C. with magnetic stirring for 45 minutes. Crushed ice is added to the mixture which is then treated with a solution of 4.5 g. of sodium hydroxide in 20 ml. of water. The mixture is brought to boiling and then chilled in an ice bath to give 1.74 g. of tan solid, M.P. 192–195°.

EXAMPLE 17

*Preparation of 1-ethyl-5-methoxy-6-methyl-3-indolecarboxaldehyde*

A mixture of 1.74 g. (9.2 mmoles) of 5-methoxy-6-methyl-3-indolecarboxaldehyde (Example 16) and 30 ml. of 40% potassium hydroxide solution is heated with mechanical stirring on the steam bath. When the mixture becomes hot, all solid dissolves and 10.0 g. (65 mmoles, 8.5 ml.) of ethyl sulfate is added in five equal portions over 1 hour. The solution is allowed to cool, whereon crystals separate from the aqueous solution. The mixture is extracted with ethyl acetate, and the extract is washed with saline, dried over magnesium sulfate and evaporated. The residue crystallizes from ether-petroleum ether (B.P. 30–60°) to give 1.287 g. of crystals, M.P. 92–94°.

EXAMPLE 18

*Preparation of 1-ethyl-5-hydroxy-6-methyl-3-indolecarboxaldehyde*

By the procedure described in Example 7 treatment of 1-ethyl-5-methoxy-6-methyl-3-indolecarboxaldehyde with powdered aluminum chloride in xylene gives grey crystals, M.P. 220–230°.

EXAMPLE 19

*Preparation of 1-ethyl-6-methyl-4,5-dioxo-3-indolecarboxaldehyde*

In the manner described in Example 10 treatment of 1-ethyl-5-hydroxy-6-methyl-3-indolecarboxaldehyde with potassium nitrosodisulfonate produces wine-colored crystals, M.P. 193–195°.

What is claimed is:

1. A member of the class consisting of compounds of the formula:

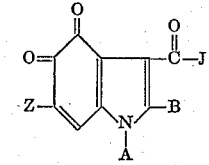

wherein A and Z are lower alkyl and B and J are each selected from the group consisting of hydrogen and lower alkyl.

2. 1-ethyl-2,6-dimethyl-4,5-dioxo-3-indolecarboxaldehyde.
3. 3-acetyl-1-ethyl-2,6-dimethyl-4,5-dioxoindole.
4. 1-ethyl-6-methyl-4,5-dioxo-3-indolecarboxaldehyde.

No references cited.

NICHOLAS S. RIZZO, *Primary Examiner.*